Figure 1:
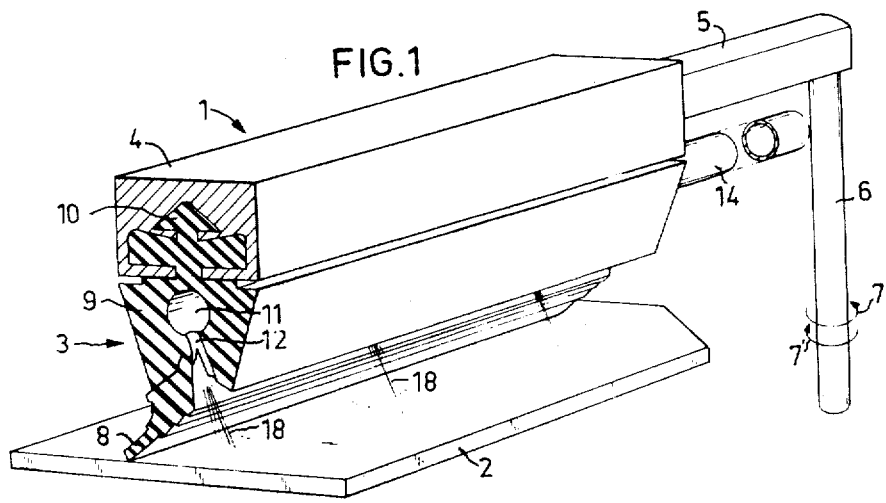

United States Patent
Regler

[11] 3,881,212
[45] May 6, 1975

[54] WIPER BLADE

[75] Inventor: Ake Ingemar Regler, Stocksund, Sweden

[73] Assignee: Safety Vehicles Development AB, Stocksund, Sweden

[22] Filed: Aug. 17, 1973

[21] Appl. No.: 389,427

[30] Foreign Application Priority Data
Aug. 23, 1972 Sweden............... 10939/72
Sept. 25, 1972 Sweden............... 13779/72

[52] U.S. Cl. ................... 15/250.04; 15/250.36
[51] Int. Cl. .................................... B60s 1/46
[58] Field of Search ....... 15/250.01–250.04, 250.36, 250.42, 250.05–250.09

[56] References Cited
UNITED STATES PATENTS

| | | | |
|---|---|---|---|
| 2,582,717 | 1/1952 | Pierce | 15/250.04 |
| 3,304,569 | 2/1967 | Christensen | 15/250.36 |
| 3,371,368 | 3/1968 | Walker | 15/250.04 |
| 3,418,676 | 12/1968 | Byczkowski et al. | 15/250.04 |
| 3,458,888 | 8/1969 | Carpenter | 15/250.04 |

FOREIGN PATENTS OR APPLICATIONS

| | | | |
|---|---|---|---|
| 1,194,037 | 5/1959 | France | 15/250.04 |
| 2,028,507 | 12/1971 | Germany | 15/250.04 |

*Primary Examiner*—Peter Feldman
*Attorney, Agent, or Firm*—Young & Thompson

[57] ABSTRACT

A wiper blade having an internal cleaning liquid conduit from which on each side of the contact member channels open into a downwardly widening slot that can be closed. As the blade moves, liquid supply from the channels on the rear side of the blade is prevented by the contact member which is provided with sealing surfaces cooperating with corresponding sealing surfaces on the blade body. The wiper blade has an attachment member that allows the blade to be used together with various types of blade holders.

9 Claims, 6 Drawing Figures

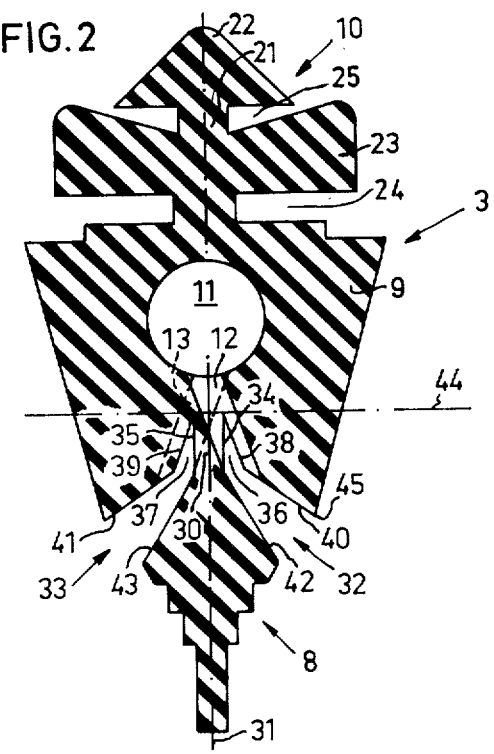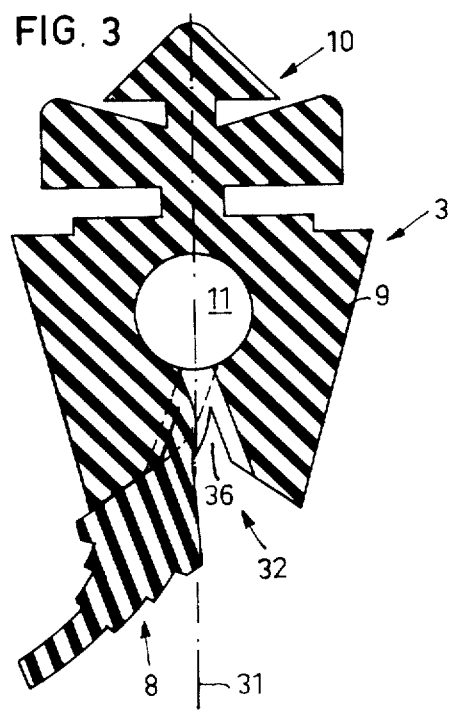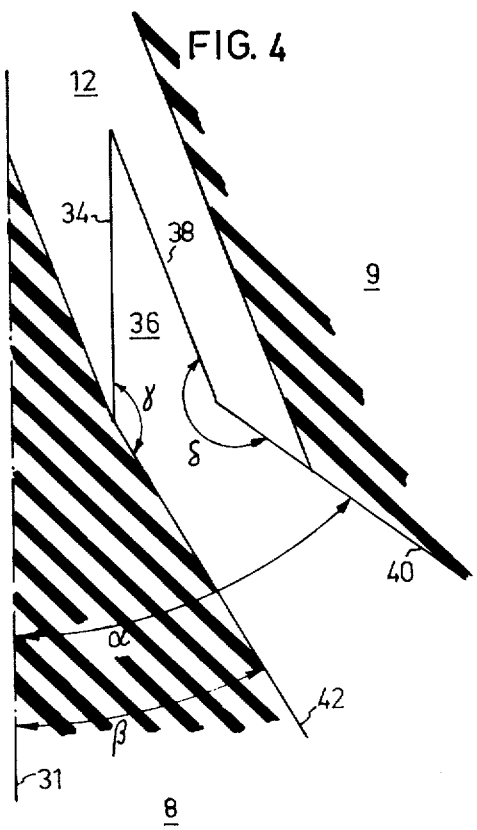

WIPER BLADE

The present invention relates to a wiper blade of elastic material for cleaning of, for example, windshields in vehicles, comprising a body which via a connecting portion carries a contact member intended for contact with the object to be cleaned, and which is mountable by means of an anchor member in a holder which moves back and forth across the object to be cleaned, there being in the body a longitudinal conduit from which the cleaning liquid can flow out on both sides of the contact member via channels, the wiper blade preferably having symmetric shape relative to a principal plane through the anchor member, the body and the contact member, the contact member being constructed with sealing surfaces which, when the contact member is bent out from a middle position to a position to one side of the principal plane are designed to sealingly abut corresponding sealing surfaces of the body, thereby allowing the liquid to flow out on only the front side of the wiper blade relative to the direction of motion at that time.

In wiper blades of this type, in which the cleaning liquid flows out directly from the wiper blade onto the object to be cleaned instead of from special rinsing nozzles, it is desirable that the contact member can easily be moved to a side position and thereby effectively close the rear channels seen relative to the direction of motion of the wiper blade. Furthermore the sealing surfaces should be so constructed and placed that the liquid is directed in an advantageous manner at the same time as the sensitivity to dirt and thereby resulting impaired sealing is as little as possible. It is previously known to close downwardly directed channels by pressing them together as a result of the movement of the contact member, but this is not sufficient for effective sealing. Also the sensitivity to dirt in other types of wiper blade is great as a result of poor placement of the sealing means. Common to the known wiper blades is that the anchor member has a shape which fits only one of a large number of different types of holders, which increases the required assortment of wiper blades.

The purpose of this invention is to achieve a wiper blade which reduces said disadvantages and which has improved sealing and function and which can be used together with a large number of different holders.

An improved sealing is obtained according to the invention in that the channels opening on the same side of the contact member open into a groove which widens in the direction from the principal plane, and the sides of which form the sealing surfaces, and in that the sealing surfaces of the body and the contact surface, as well as the contact member, lie on the same side of a plane which is perpendicular to the principal plane and which intersects the connecting portion of the contact member at the near portion of the body.

In an appropriate embodiment according to the invention, the sealing surfaces on the body and on the contact member are directed essentially obliquely downwards, which facilitates drilling of the channels and allows the stream of rinsing liquid to be directed essentially along the sealing surfaces of the contact member so that the object to be cleaned is hit at an advantageous obtuse angle.

The desired construction of the anchor member is achieved according to the invention by the fact that in the anchor member there is a rib which is attached to the body and which projects from the same, which rib has at its end remote from the body an attachment head, and that on both sides of the rib supports project in such a way that between the body and each support there is formed a lower groove, and between each support and the attachment head there is formed an upper groove, which grooves are designed to enclose bladelike elements in a holder for wiper blades. An especially advantageous construction is obtained when the supports are arranged so that when the upper grooves enclose elements from a holder, they deflect from their unloaded rest positions and abut the body with at least one portion of the side facing the body. Further embodiments and advantages are given in the accompanying description and claims.

Figure 5:
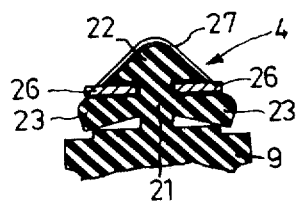
Figure 6:
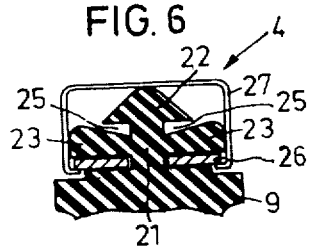

The invention will be described in more detail in the following with the help of examples shown in the accompanying drawings, in which FIG. 1 shows a schematic perspective drawing, partially in section, of a wiper device with a wiper blade according to the invention, FIG. 2 shows a cross section through a wiper blade in the neutral position according to the invention, FIG. 3 shows a cross section through the same wiper blade as in FIG. 2 with the contact member bent to one side, FIG. 4 shows an enlargement of a detail of FIG. 2, FIG. 5 shows the wiper blade mounted in a common type of holder, and FIG. 6 shows the wiper blade mounted in another common type of holder.

In the wiper device 1 shown in FIG. 1 for cleaning of a windshield 2 there is included a wiper blade 3 which is secured in a holder 4 and contacts the windshield. The holder is in turn attached, via an arm 5, to an axle 6 which with the help of a drive arrangement (not shown) can alternatingly be rotated in the direction of the arrows 7 and 7' so that the wiper blade thereby is given a back and forth motion across the windshield 2. The lower portion of the wiper blade is constructed as a contact member 8 which can be bent laterally in relation to the body 9 of the wiper blade, the upper portion of said body being in the form of an anchoring member 10 which fits into the holder 4.

Inside the body 9 a conduit 11 is disposed in the form of a longitudinal hole closed at one end. From the conduit a number of channels 12,13 open to each side of the contact member. The conduit 11 is connected to a liquid conduit 14 through which pressurized liquid can be supplied from a liquid container (not shown).

In using the wiper blade the contact member 8 will, due to the friction against the windshield 2, be bent laterally from the free resting position shown in FIG. 2. The position shown in FIG. 1 is adopted when the axle 6 rotates in the direction indicated by the arrow 7, the channels 13 being held closed so that the liquid cannot be forced out through them, while on the other hand the channels 12 are open and let through jets of liquid 18 onto the windshield. When the direction of rotation of the axle 6 is reversed to 7', the contact member bends in the opposite direction, thereby opening channels 13 and closing channels 12.

As is disclosed in more detail in FIG. 2, the wiper blade 3 has at the bottom a contact member 8 which is connected to the body 9 via a connecting portion 30. The wiper blade consists of flexible material, preferably rubber, and preferably has a symmetrical shape relative to a principal plane 31 through the anchoring member 10, the body 9 and the contact member 8. From the conduit 11 channels 12 and 13 open into individual grooves 32 and 33 which widen out in the direction from the principal plane 31 on each side of the contact member 8. The side surfaces 34 and 35 of the connecting portion 30 are essentially parallel and form one side of individual wedge-shaped pockets 36,37 in the upper portion of the grooves 32 and 33, respectively. The other side of each of the wedge-shaped pockets is formed by the corresponding surface 38 or 39, respectively, of the body 9. These latter surfaces connect at the bottom to sealing surfaces 40 and 41, respectively, which are designed to work in conjunction with sealing surfaces 42 and 43, respectively, disposed on the contact member 8 and connected to the lower portions of the surfaces 34 and 35.

The planes in which the sealing surfaces 40 and 42 are situated intersect each other essentially in the principal plane 31, and at least one of the planes of the two surfaces forms an acute angle $\alpha,\beta$ with the principal plane through the contact member. The surfaces 34 and 42 form the angle $\gamma$ with each other and the surfaces 38 and 40 form the angle $\delta$ with each other. Both of these angles are obtuse (see FIG. 4). The corresponding relationships apply to the other side of the principal plane 31.

The contact member 8 and all of the sealing surfaces 38,39,40,41 on the body 9 and 34,35,42,43 on the contact member lie on the same side of a plane 44 which is perpendicular to the principal plane 31 and cuts the region where the connecting portion 30 of the contact member 8 joins the body 9.

To close off the flow of fluid from the channel 13, the contact member 8 is moved to the left (see FIG. 3) so that both of the sealing surfaces 41 and 43 lie against one another and essentially prevent the flow of liquid through the lower portion of the groove 33. At the same time the two sealing surfaces 35 and 39 will also lie against each other, thereby closing off the wedge-shaped pockets (see FIG. 3). This avoids the formation of a channel formed by the pocket in which the liquid is under pressure and can flow out at the ends of the blade.

In the construction shown here at least a portion of each of the channels 12 and 13 is situated in the connecting portion of the contact member. The channels 12 and 13 are made preferably by drilling, and the drilling is facilitated by the grooves 32 and 33 assisting in the guiding of the drill. An appropriate channel diameter is about 0.5 mm but other dimensions can also be chosen, a large diameter producing a heavier rinsing. Normally channels opening on the same side of the contact member are placed with a spacing of 5–10 cm, but a different spacing is also possible. The channels opening on both sides of the contact member can, as has been shown here, be staggered in the longitudinal direction of the blade, but can of course also be placed in the same blade cross section.

To avoid unnecessary friction and possible disruptions of function, the lower edge 45 of the body 9 should always be a sufficient distance from the object to be wiped.

A number of other embodiments than those shown here are of course conceivable within the scope of the invention, and especially the placement and shape of the channels 12 and 13 and the grooves 32 and 33 can be varied to direct the rinse liquid in the desired manner. The conduit 14, for example, can be connected in another manner than that shown, for example to a connection essentially in the middle of the wiper blade.

The wiper blade according to the invention is appropriately manufactured of rubber, but other elastic materials such as plastics are also conceivable. In contrast to the majority of commonly occurring wiper blades, which are produced by moulding, the wiper blades according to the invention is designed to be produced by injection moulding. The injection moulded wiper blade string is then provided with channels by drilling or in another appropriate manner and is then cut into the desired length. The end of the conduit is then closed off for example with the help of a plug which can be secured by glueing, vulcanizing or by other means.

By injection moulding it is possible to manufacture wiper blades of various lengths with a minimum of tools. It is also possible to cut off the desired length, when sold, from a roll of wiper blade string, thereby reducing the need for keeping a large number of types of wiper blades in stock.

In previously known types of wiper blades the anchoring member 10 for various types of wiper blades is constructed in a special way to fit a special type of holder. Therefore it is difficult if not impossible to use one type of wiper blade in different holders. In contrast to common practice the anchor member 10 according to the invention is constructed as a universal anchor member designed to be usable with a number of marketed holders.

As is shown in FIG. 2 the anchor member 10 consists of a rib 21 constructed as one piece with the body 9, and which has an attachment head 22 at the top. Supports 23 protrude between the body 9 and the attachment head 22 on both sides of the rib 21 in such a manner that a lower groove 24 is formed between the body and the support, and an upper groove 25 is formed between the support and the attachment head.

According to FIG. 5 the anchor member 10 is mounted in a holder 4 of the type in which two parallel bands 26 are held together by spaced clasps constructed as one piece with the bands. The bands 26 are inserted in the upper grooves 25 and lie with their lower sides against the upper sides of the supports 23, which in turn are deflected from their free rest positions and with at least a portion of the side facing the body abut the body so that the body is secured laterally and cannot be set at an angle relative to the bands 26.

According to FIG. 6 the anchor member 10 is instead mounted in a holder 4 of the type where two parallel bands 26 are held in place by one or more free clasps 27. The bands are inserted in the lower grooves 24 and lie directly against the body 9, thereby achieving good control of the same. The clasp or clasps 27 are held in place appropriately by the attachment portion 22 as well as the supports 23 being tensioned somewhat against the clasp 27, i.e. are forced into the same.

The two holders described in FIGS. 5 and 6 are only examples of holders in which the anchoring member 10 can be used. Such holders can be attached to arms 5 of various constructions. It is of course not necessary to always combine universal anchoring members 10 of the type described with rinsing wiper blades. Rather, a number of other combinations are also possible, for example a universal anchoring member on a conventional wiper blade.

What I claim is:

1. In a wiper blade of elastic material for cleaning of, for example, windshields in vehicles, comprising a body which, via a connecting portion carries a contact member intended for contact with the object to be cleaned and which is mountable by means of an anchor member in a holder which moves back and forth across the object to be cleaned, there being in the body a longitudinal conduit from which cleaning liquid can flow out on both sides of the contact member via channels, the contact member being constructed with sealing surfaces which, when the contact member is bent out from a middle position to a position to one side of the medial plane sealingly abut corresponding sealing surfaces of the body, thereby allowing the liquid to flow out on only the front side of the wiper blade relative to the direction of motion at that time; the improvement in which the channels opening on the same side of the contact member open into a groove which widens in a direction away from the medial plane, and the sides of which form the sealing surfaces, the sealing surfaces of the body and the contact member as well as the contact surface lying on the same side of a plane which is perpendicular to the medial plane and which intersects the region where the connecting portion of the contact member joins the body.

2. Wiper blade according to claim 1, characterized in that the angle between the plane of at least one of the sealing surfaces and the medial plane through the contact member is acute.

3. Wiper blade according to claim 2, characterized in that the planes of two sealing surfaces on the same side of the medial plane are disposed to intersect each other substantially in the medial plane.

4. Wiper blade according to claim 1, characterized in that the connecting portion of the contact member has two substantially parallel sides, each of which connects at one end with the adjacent sealing surface of the contact member and forms one side of a wedge-shaped pocket whose other side connects with the adjacent sealing surface of the body.

5. Wiper blade according to claim 1, characterized in that the connecting portion of the contact member has a first sealing surface which forms one side of a wedge-shaped pocket, the other side of which is formed of a corresponding first sealing surface on the body, and that both of said sealing surfaces each border on a second sealing surface which forms an obtuse angle with the bordering first sealing surface so that both the corresponding first sealing surfaces and both the corresponding second sealing surfaces substantially seal against one another when the contact member is bent to one side and closes said wedge-shaped pocket.

6. Wiper blade according to claim 1, characterized in that at least a portion of each channel from the conduit to the space between two cooperating sealing surfaces lies in the connecting portion of the contact member.

7. Wiper blade having a body and an anchor means for mounting the wiper blade in a holder which moves back and forth across the object to be cleaned, characterized in that in the anchor member there is a rib which is attached to the body and which projects from the same, which rib has at its end remote from the body an attachment head, and that on both sides of the rib supports project in such a way that between the body and each support there is formed a lower groove, and between the support and the attachment head there is formed an upper groove, which grooves are designed to enclose blade-like elements in a holder for wiper blades.

8. Wiper blade according to claim 7, characterized in that the supports are disposed so that, when the upper grooves enclose elements from a holder, the supports are deflected from their free rest positions and lie in contact with the body with at least a portion of the side which faces the body.

9. Wiper blade according to claim 1, characterized by a symmetric shape on opposite sides of said medial plane.

* * * * *